(12) United States Patent
Aoudia et al.

(10) Patent No.: US 12,349,002 B2
(45) Date of Patent: Jul. 1, 2025

(54) DEEP LEARNING-BASED WIRELESS COMMUNICATION SYNCHRONIZATION STRUCTURES

(71) Applicant: NVIDIA Corp., Santa Clara, CA (US)

(72) Inventors: Faycal Ait Aoudia, Saint-Cloud (FR); Jakob Hoydis, Paris (FR); Sebastian Cammerer, Tuebingen (DE); Matthijs Jules Van Keirsbilck, Berlin (DE); Alexander Keller, Berlin (DE)

(73) Assignee: Nvidia Corp., Santa Clara, CA (US)

( * ) Notice: Subject to any disclaimer, the term of this patent is extended or adjusted under 35 U.S.C. 154(b) by 369 days.

(21) Appl. No.: 18/189,565

(22) Filed: Mar. 24, 2023

(65) Prior Publication Data
US 2023/0379746 A1 Nov. 23, 2023

Related U.S. Application Data

(60) Provisional application No. 63/342,766, filed on May 17, 2022.

(51) Int. Cl.
*H04W 28/02* (2009.01)
*H04B 1/713* (2011.01)
*H04W 74/0833* (2024.01)

(52) U.S. Cl.
CPC ........ *H04W 28/0226* (2013.01); *H04B 1/713* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 10,797,805 | B1 * | 10/2020 | Mirfakhraei | G06N 3/08 |
| 11,128,391 | B1 * | 9/2021 | Aldossari | H04B 17/3911 |
| 2018/0302213 | A1 * | 10/2018 | Bose | H04L 25/0212 |
| 2020/0252318 | A1 * | 8/2020 | Kleider | H04B 17/3913 |

OTHER PUBLICATIONS

Chougrani, Efficient Preamble Detection and Time-of-Arrival Estimation for Single-Tone Frequency Hopping Random Access in NB-IoT, IEEE Internet of Things Journal, vol. 8, No. 9, May 1, 2021, pp. 7437-7449.
Jepersen et al, Deep Learning for Synchronization and Channel Estimation in NB-IoT Random Access Channel, Mitsubishi Electric Research Laboratories (MERL), Cambridge, MA, USA.

* cited by examiner

*Primary Examiner* — Diane L Lo
(74) *Attorney, Agent, or Firm* — Carnelian Law, LLC

(57) ABSTRACT

Neural network-based structures for action user equipment device detection, estimation of time-of-arrival, and estimation of carrier frequency offset utilized with the narrowband physical random-access channel of wireless communication systems. The structure includes a neural network to generate predictions of active user equipment devices, and a twin neural network to generate time-of-arrival predictions for signals from the user equipment devices and carrier frequency offset predictions for signals from the user equipment devices.

20 Claims, 12 Drawing Sheets

DEEP LEARNING-BASED WIRELESS COMMUNICATION SYNCHRONIZATION STRUCTURES

CROSS-REFERENCE TO RELATED APPLICATIONS

This application claims priority and benefit under 35 U.S.C. 119 to U.S. Application Ser. No. 63/342,766, titled "Deep Learning-Based Synchronization for Uplink NB-IoT", filed on May 17, 2022, the contents of which are incorporated herein by reference in their entirety.

BACKGROUND

Narrowband internet of things is a radio technology standard developed by the Third Generation Partnership Project to enable a wide range of Internet-of-Things services and user equipment. Narrowband internet of things is built upon 5G New Radio specifications, with a goal to enable massive numbers of connected user equipment devices and to provide very good indoor coverage, very low power consumption to enable long battery lifetime, and low-cost connectivity.

In the uplink, many user equipment devices may simultaneously contend to access the channel in a random-access manner. The narrowband physical random-access channel is utilized for the first message sent by a user equipment device to a base station to request access to the channel. The narrowband physical random-access channel is used by the base station to identify the user equipment device and to estimate its time-of-arrival and carrier frequency offset.

The narrowband physical random-access channel waveform comprises a single-tone frequency-hopping preamble. Different configurations of the waveform may be utilized depending on channel conditions and cell sizes. Frequency hopping is performed according to a pseudo-random pattern to mitigate inter-cell interference, such that neighboring cells use different hopping patterns.

Within a cell, up to 48 orthogonal hopping patterns are available for the user equipment devices to choose from. User equipment devices that simultaneously request access to the channel must use different patterns to avoid collisions. The narrowband physical random-access channel detection must jointly detect the user equipment devices that simultaneously attempt to access the channel and estimate their time-of-arrival and carrier frequency offsets.

Many conventional narrowband physical random-access channel mechanisms assume that:
  i. the channel frequency response is flat, which is reasonable considering the narrow bandwidth of narrowband internet of things (180 kHz)
  ii. interference between user equipment devices may be neglected, which only holds true assuming low carrier frequency offsets and low mobility
  iii. the channel is time-invariant over the duration of the preamble, which is only valid under low mobility.

Many conventional narrowband physical random-access channels also require the configuration of a detection power threshold that depends on the noise-plus-interference level, and which controls the trade-off between the occurrence of false positives and false negatives. These assumptions and constraints of conventional narrowband physical random-access channel mechanisms limit their utility.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
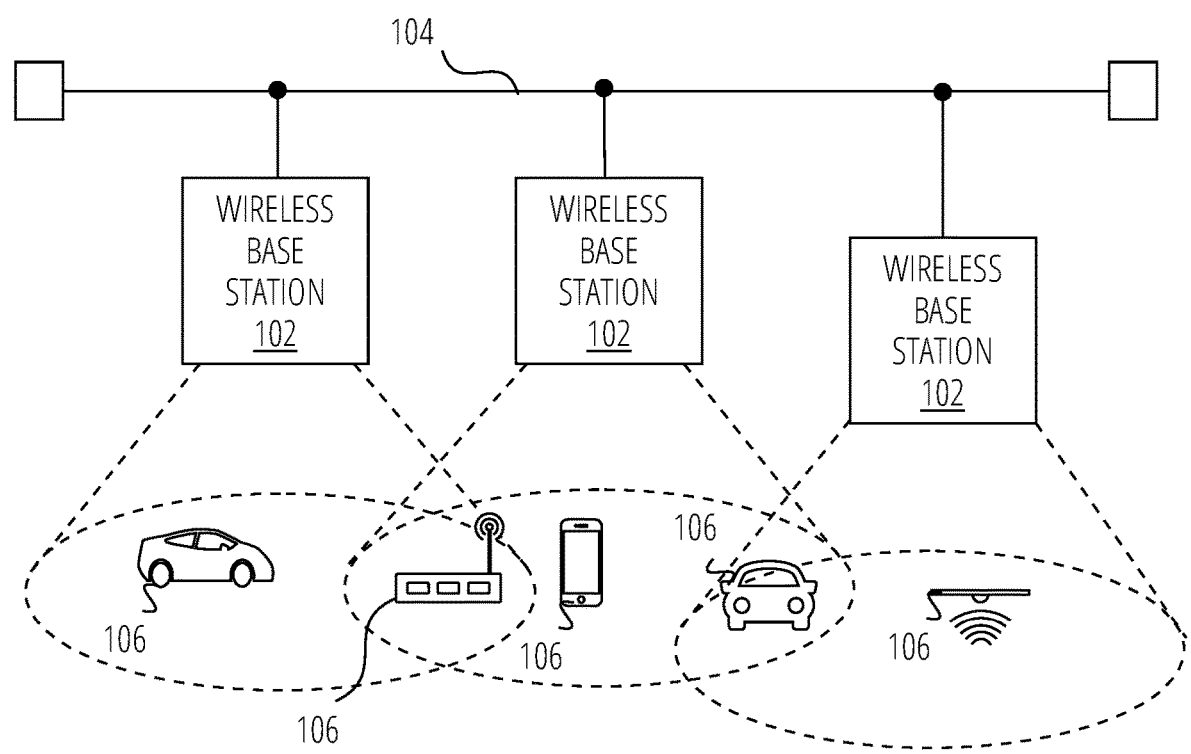
FIG. 1 is a high-level depiction of a wireless communication system in one embodiment.

Terms used in the following description may be better understood as follows. If not specifically defined, terms should be accorded the meaning understood by those of ordinary skill in the art.

"Base station" refers to devices providing a connection between wireless user equipment devices and a wider communication network.

"Carrier frequency offset" is a frequency mismatch between the transmitter and receiver oscillators which incurs a mismatch between the receiver oscillator and the frequency of the received signal. It causes undesired interference between the subcarriers.

"Internet-of-Things" refers to devices (or groups of devices) with sensors, processing ability, and other logic to connect and exchange data with one another and with centralized systems over the Internet or other communications networks.

"Neural sub-network" refers to a neural network structure within a larger neural network structure.

"Time-of-arrival" is the propagation delay, i.e., the time it takes to the transmitted signal to reach the receiver.

"User equipment device" refers to any device that utilizes a base station for wireless communications. User equipment devices may be mobile or fixed-position.

Mechanisms are disclosed for device detection, estimation of time-of-arrival, and estimation of carrier frequency offset. These mechanisms may be utilized with the narrowband physical random-access channel of narrowband internet of things, for example.

Embodiments of a deep learning-based narrowband physical random-access channel synchronization structure are described. These structures may avoid constraints of prior art mechanisms and may operate without configuration of a detection threshold. The described mechanisms comport with wireless communication standards such as 5G New Radio and Third Generation Partnership Project, and operate on the base station, which does not increase the logic complexity of user equipment devices.

The disclosed mechanisms in one embodiment comprise a system that includes a preprocessor to transform a wireless channel resource grid for a plurality of user equipment devices into a matrix of symbol groups for a narrowband physical random-access channel. A first neural network is configured to transform the symbol groups from the preprocessor into predictions of active user equipment devices, and a second neural network, comprising a twin neural network, includes a first neural sub-network to transform the symbol groups from the preprocessor into time-of-arrival predictions for signals from the user equipment devices, and a second neural sub-network to transform the symbol groups from the preprocessor into carrier frequency offset predictions for signals from the user equipment devices.

The system may comprise residual convolutional networks configured with knowledge of the preamble structure of 5G New Radio signaling, for improved performance. The neural networks may be trained with loss functions that provide greater accuracy than conventional approaches for time-of-arrival and carrier frequency offset estimates. Decreases in false negative rate and false positive rate may be achieved. Performance and accuracy improvements over a wide range of channel conditions, carrier frequency offsets, and probabilities of transmission.

The system may be deployed to provide synchronization mechanisms on wireless base stations, therefore introducing no additional complexity on end user devices. Base station deployment may enable extension of battery lifetime in user equipment devices utilized for wireless communication via reductions in the utilized preamble length and/or the transmit power utilized by such devices.

FIG. 1 is a high-level depiction of a wireless communication system in which embodiments of the disclosed mechanisms may be deployed. The system comprises a plurality of wireless base stations 102 coupled to a wireline network backbone 104. The wireless base stations 102 provide wireless communication capabilities to a plurality of user equipment devices 106, such as vehicles, mobile phones/tablets/computers, and Internet-of-Things devices such as sensors, device controllers, set-tops, and so on.

Figure 2:
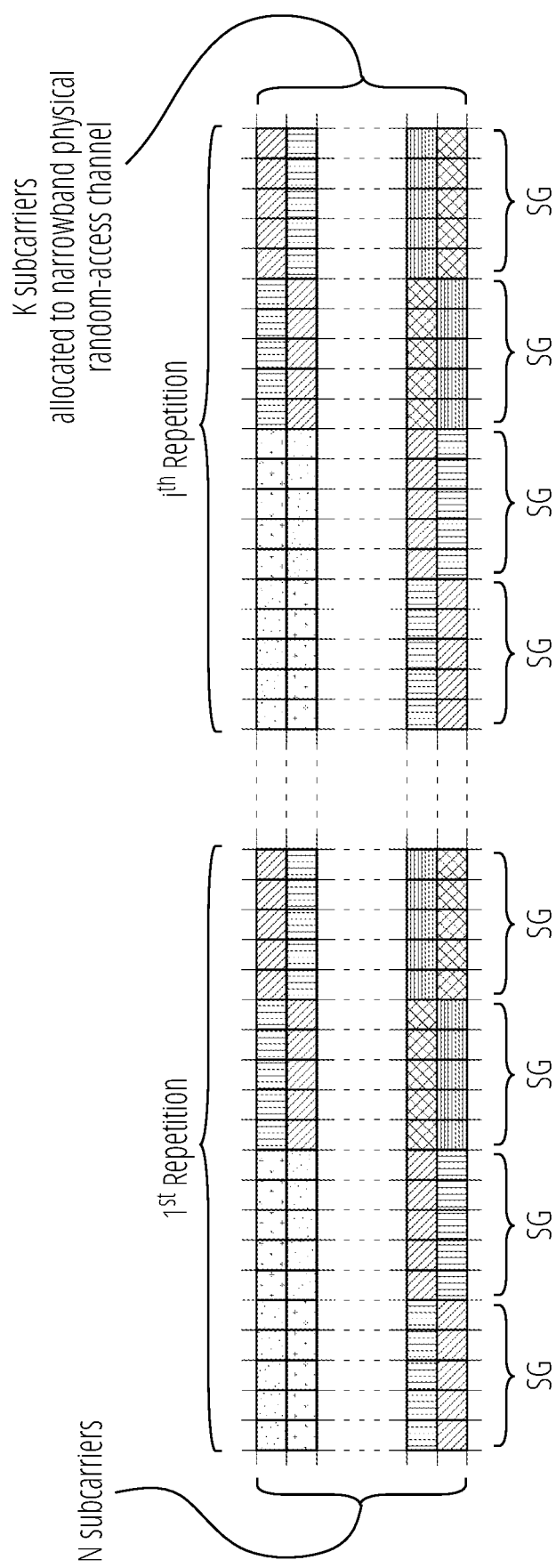
FIG. 2 depicts an example of a narrowband physical random-access channel structure.

FIG. 2 depicts an example of a narrowband physical random-access channel structure utilized by base station devices such as those depicted in the system of FIG. 1 Each individual preamble structures from a particular different user equipment device is depicted by runs of boxes having a particular hatch pattern.

The narrowband physical random-access channel waveforms comprise sequences of symbol groups within the subcarrier bands. Each symbol group may comprise five identical single-tone orthogonal frequency division multiplexing symbols that share a single cyclic prefix to reduce overhead. Each symbol group may occupy one tone (for example of 3.75 kHz). Frequency hopping may be performed between the symbol groups, and four consecutive symbol groups may be treated as a basic unit of the preamble structure. This basic structural unit of the preamble is referred to herein as a repetition. In one embodiment the preamble structure may comprise up to 128 repetitions.

Let K denote a maximum number of user equipment devices that may simultaneously access a wireless channel. Assume that user equipment devices that simultaneously request access to the channel do not collide, meaning that they utilize different carrier frequency hopping patterns. In one embodiment a maximal value for K is 48, the highest number of carrier frequency hopping patterns available. The samples transmitted by the $k^{th}$ user for the $i^{th}$ symbol of the $m^{th}$ symbol group may be represented by $$s_{k,m,i}[n] = \sqrt{\beta_k}\, e^{j2\pi\phi_k[m]\frac{n}{N}} \qquad (1)$$

where $\beta_k$ is the transmission power used by the $k^{th}$ user, N is the number of subcarrier bands, and $\phi_k[m]$ is the subcarrier band index used by the $k^{th}$ user for the $m^{th}$ symbol group. This subcarrier band index is determined by the carrier frequency hopping pattern. The number of subcarrier bands N may be greater than the maximum number of user equipment devices K that may access the channel, because the narrowband physical random-access channel is only a portion of the radio spectrum processed by the base station.

A multi-user time-invariant multipath channel may have a channel response of the $k^{th}$ user equipment device determined by $$h_k(\tau) = \sum_{p=0}^{P_k-1} a_{k,p}\delta(\tau - \tau_{k,p}) \qquad (2)$$

where $P_k$ is the number of paths for the $k^{th}$ user, and $a_{k,p}$ and $\tau_{k,p}$ the baseband coefficient and delay of the $p^{th}$ path of the $k^{th}$ user equipment device, respectively. The time-of-arrival of the $k^{th}$ user equipment device is $$D_k := \min_p \tau_{k,p}. \qquad (3)$$

The received signal at the base station is $$y_{m,i}[n] = \sum_{k=0}^{K-1} \sum_{l=L_{min}}^{L_{max}} A_k h_{k,l} s_{k,m,i}[n-l] e^{j2\pi f_{off,k}(n-l)} + w_{m,i}[n] \qquad (4)$$

where $A_k$ indicates if user equipment device k is active: it equals 1 if the user equipment device k is transmitting and 0 otherwise. The term $h_{k,l}$ is the channel coefficient of the $l^{th}$ tap and of the $k^{th}$ user equipment device, $f_{off,k}$ is the carrier frequency offset of the $k^{th}$ user equipment device normalized by the sampling frequency, $w_{m,i}[n]$ is the additive white Gaussian noise with variance $\sigma^2$, and $L_{min}$ and $L_{max}$ are the smallest and largest time-lag, respectively. Assuming (sinc) pulse shaping on the transmitter side and (sinc) matched filtering on the receiver side, the channel taps are $$h_{k,l} = -1\sum_{p=0}^{P_k-1} a_{k,p} sinc(l - W\tau_{k,p}) \qquad (5)$$

$$h_{k,l} = F^{-1}\{rect(f)H_k(f)\}(l) \qquad (6)$$

where $W = N\Delta_f$ is the bandwidth, $F^{-1}\{X(f)\}(t)$ the inverse Fourier transform of $X(f)$ evaluated at t, and $$H_k(f) = \sum_{p=0}^{P_k-1} a_{k,p} e^{-j2\pi\tau_{k,p}Wf} \qquad (7)$$

the frequency response of the channel.

On the receiver side, the cyclic prefix of each symbol group may be removed, and discrete Fourier transform (DFT) may be performed leading to a resource grid Y of size N×5S where S is the number of symbol groups forming the preamble structure. Narrowband Physical random-access channel synchronization involves jointly detecting the active user equipment devices and estimating their time-of-arrivals and carrier frequency offsets from the received signal Y.

Figure 3A:
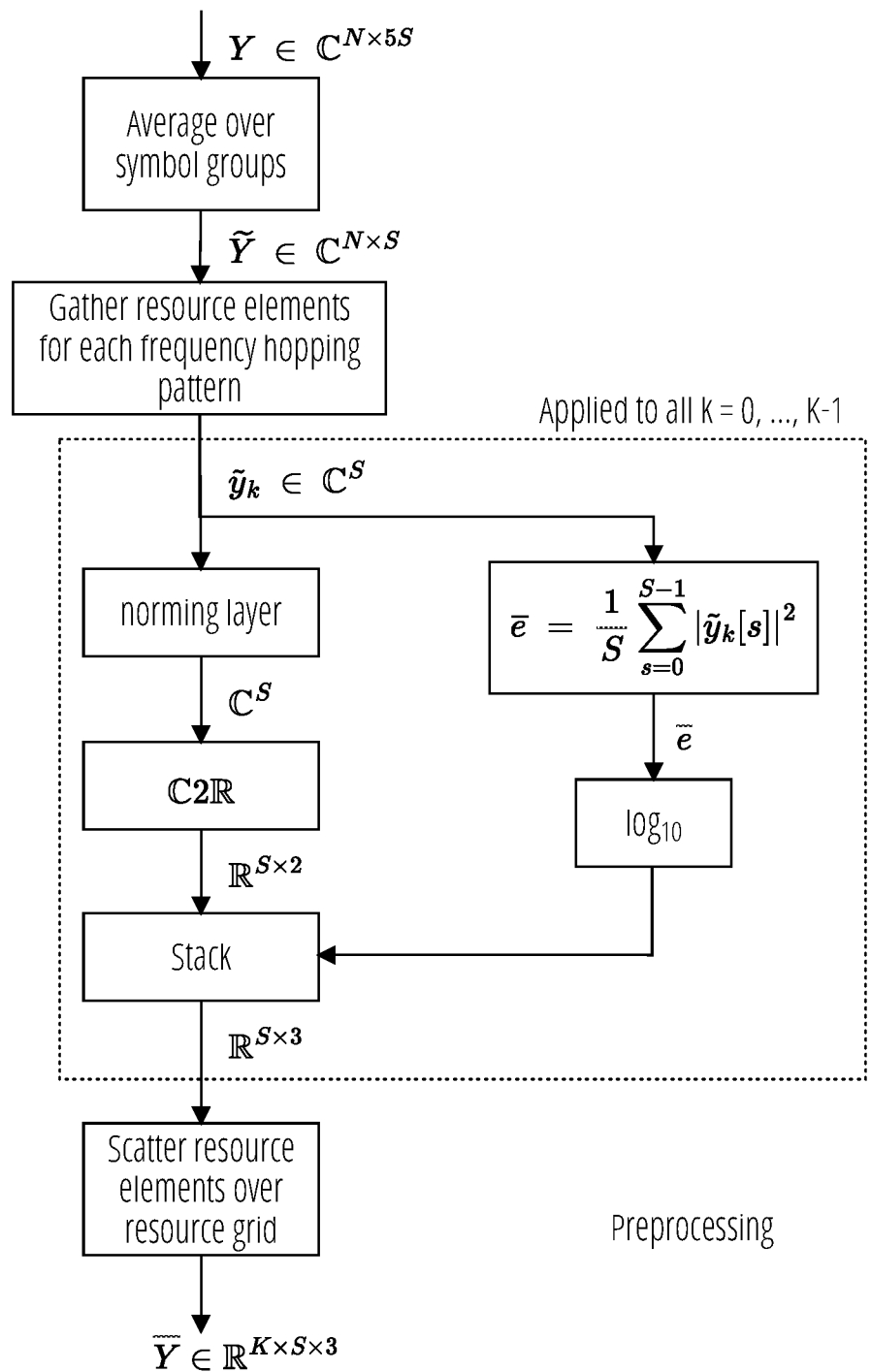
FIG. 3A-FIG. 3C depict a neural network structure to perform narrowband physical random-access channel synchronization in accordance with one embodiment.
Figure 3B:
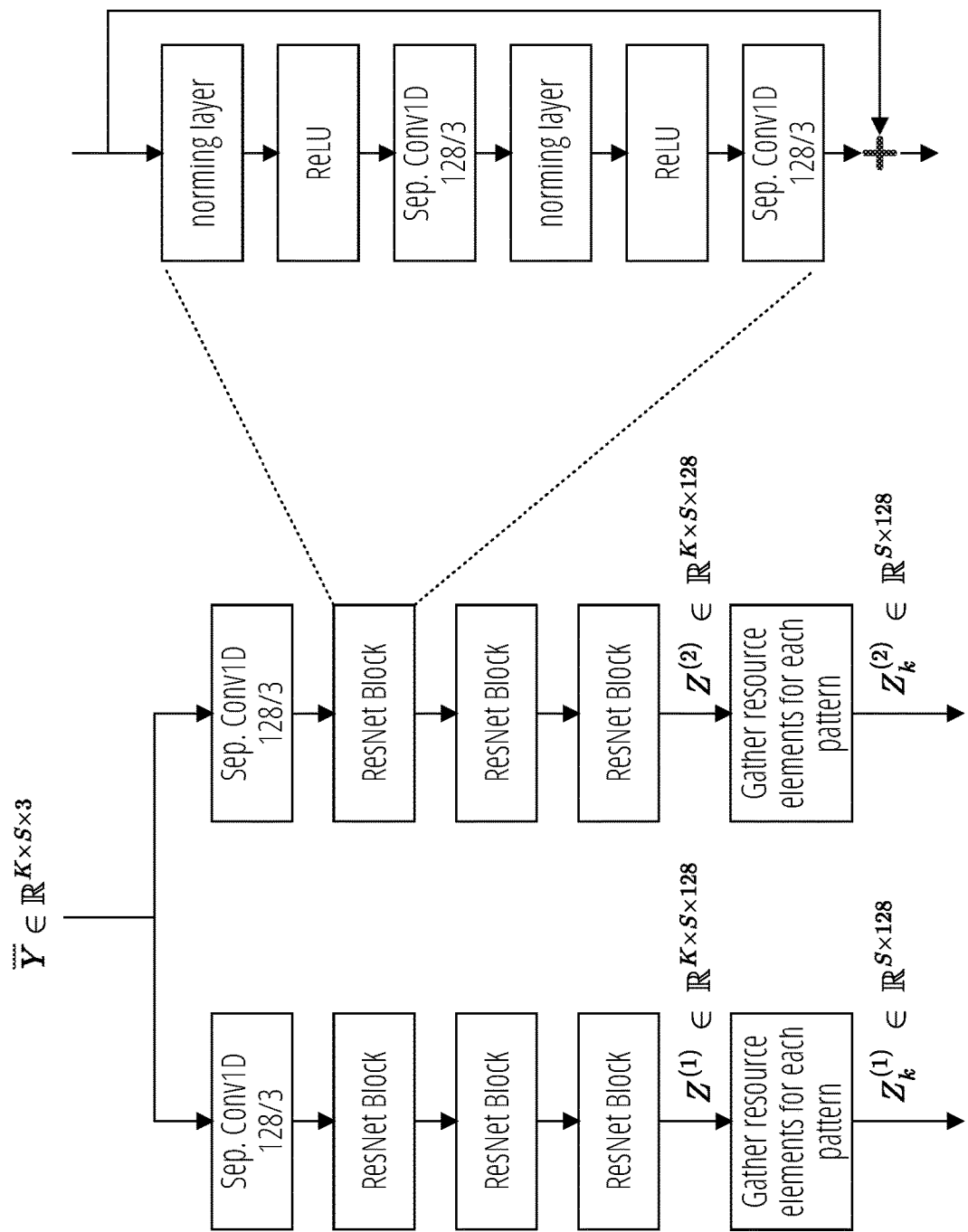
Figure 3C:
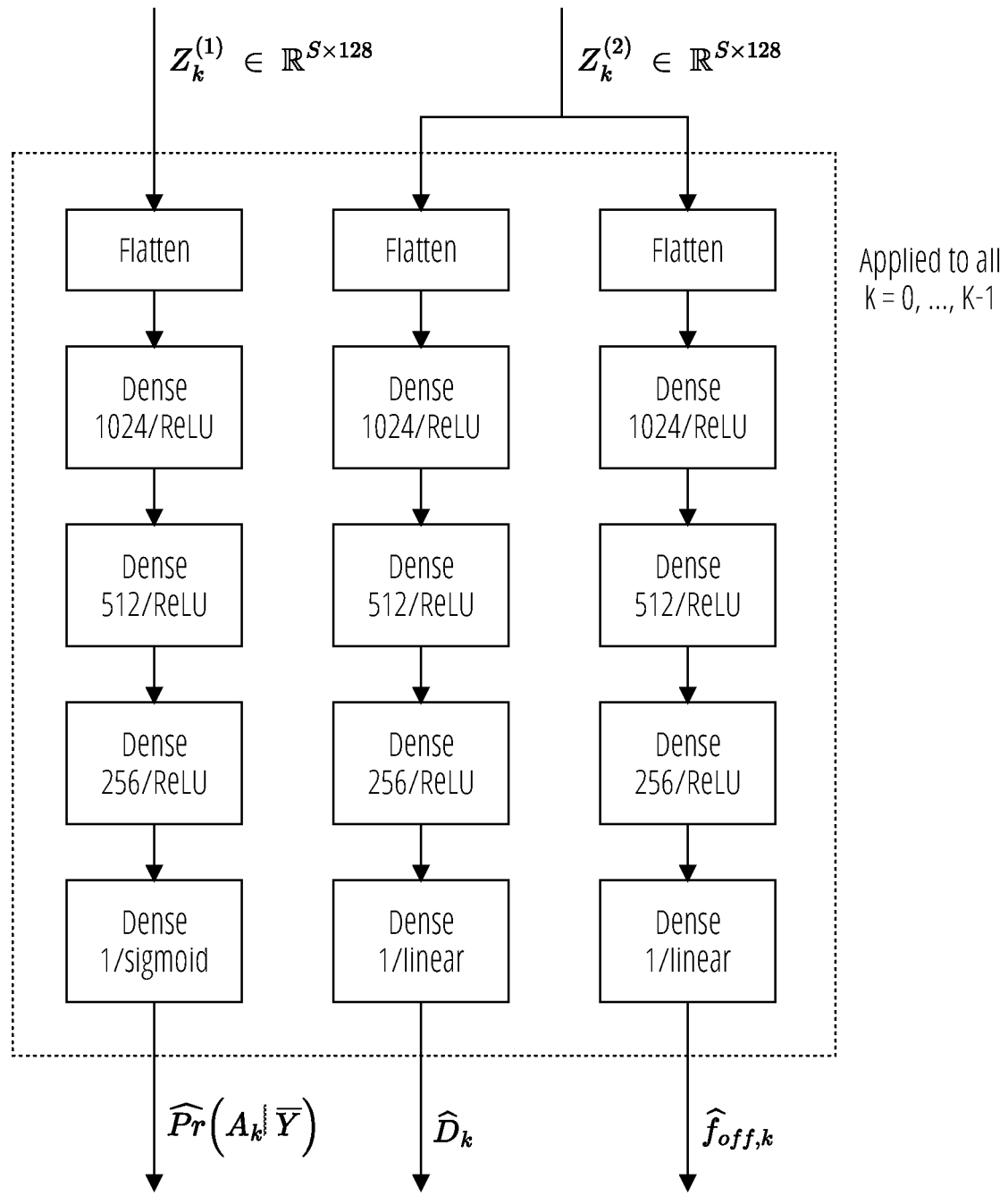

FIG. 3A-FIG. 3C depict an embodiment of a neural network-based structure to perform narrowband physical random-access channel synchronization. For dense layers, the number of units and activation function are indicated. For separable convolution layers, the number of kernels and kernel size are indicated.

The neural network is configured to transform wireless signals into (a) predictions of active user equipment devices that are transmitting carrier frequency hopping signals, (b) time-of-arrival predictions for the signals from the user equipment devices, and (c) carrier frequency offset predictions for the signals from the user equipment devices, the neural network comprising. The neural network is constructed as a first feed-forward path to transform symbol groups derived from the wireless signals into predictions of active user equipment devices, a second feed-forward path to transform the symbol groups into time-of-arrival predictions for the signals from the user equipment devices, and a third feed-forward path to transform the symbol groups into carrier frequency offset predictions for the signals from the user equipment devices.

At a high level, the structure comprises a preprocessor to transform a wireless channel resource grid for a plurality of user equipment devices into a matrix of symbol groups for a narrowband physical random-access channel. A first neural network transforms the symbol groups from the preprocessor into predictions of active user equipment devices. A first twin neural network includes a first neural sub-network to transform the symbol groups from the preprocessor into time-of-arrival predictions for signals from the user equipment devices, and a second neural sub-network to transform the symbol groups from the preprocessor into carrier frequency offset predictions for signals from the user equipment devices. Each neural sub-network may include a pipeline of depth-wise separable convolution layers.

The structure inputs the resource grid $Y \in \mathbb{C}^{N \times 5S}$ and generates, for each user equipment device k, a probability that the user equipment device is active. This probability is denoted by $\widehat{Pr}(A_k|Y)$. The structure also generates an estimate of the time-of-arrival for the user equipment device, denoted by $\hat{D}^k$, and an estimate of the carrier frequency offset of the user equipment device, denoted by $\hat{f}_{off,k}$.

The symbol group Y is preprocessed into a real-valued matrix $\overline{Y} \in \mathbb{R}^{K \times S}$. This matrix is input to two neural networks, one to compute the probabilities of active user equipment devices, and the other to compute the time-of-arrival and carrier frequency offset estimates.

Preprocessing comprises averaging the five resource elements forming each symbol group. Each user equipment device that is requesting channel access transmits the same symbol over the duration of a symbol group. Averaging may be performed separately for each subcarrier band. Averaging is efficient due to the single-tone nature of the preambles. The averaging in this example reduces the input size to the neural network by a factor of five, resulting in a matrix $\tilde{Y} \in \mathbb{C}^{N \times S}$.

Preprocessing continues with separately normalizing the sequences of symbol groups corresponding to the K carrier frequency hopping patterns utilized by or available to the user equipment devices. This may enable accurate detection of user equipment devices seeking access to the channel despite those devices having signal-to-noise ratios that differ by possibly orders of magnitude due to path loss.

Normalization is carried out by first gathering K sequences corresponding to the available carrier frequency hopping patterns $\tilde{y}_k \in \mathbb{C}^S$, $0 \leq k \leq K-1$ (e.g., those carrier frequency hopping patterns described in the 3GPP specifications). Each sequence is normalized separately from the others. The resulting normalized sequences are converted from complex valued vectors of size S to real-valued tensors by stacking the real and imaginary components along an additional dimension, resulting for each hopping pattern in a real-valued tensor of shape S×2.

This normalization process erases information about the received power. To preserve this information, the average received power of each sequence may be determined prior to normalization and concatenated to the normalized sequence of symbol groups along the inner dimension, resulting in a real-valued tensor of shape S×3. The average power may be added in logarithm with base 10 scale due to the range spanning several orders of magnitude due to path loss. The K resulting tensors may be scattered over the resource grid according to the carrier frequency hopping patterns, reverting the previous gathering operation, to form a normalized tensor $\overline{Y} \in \mathbb{R}^{K \times S \times 3}$.

The tensor $\overline{Y}$ is input to two neural networks comprising a same structure. For each user equipment device, the first neural network transforms the tensor $\overline{Y}$ into a probability that the user equipment device is requesting channel access. The second neural network transforms the tensor $\overline{Y}$ into estimates of the time-of-arrival and the carrier frequency offset of the corresponding user equipment device.

A first stage of both neural networks comprises, in one embodiment, a pipeline of one-dimensional (1D) convolutional layers followed by nonlinearity and normalization layers. These kernels are configured to operate along the frequency dimension of the input tensor $\overline{Y}$. Utilization of depth-wise separable convolutional layers may significantly decrease computational complexity compared to conventional convolutional layers, without sacrificing accuracy. These layers may be configured with skip connections to avoid gradient vanishing. They may also utilize padding to ensure that the generated outputs have the same length as the input tensors.

The resulting tensors are denoted by $Z^{(1)}$ and $Z^{(2)}$ for the first and second neural networks, respectively, and have shape K×S×C, where the dimension C corresponds to the "channels" of the convolution. The pipeline of convolution layers determines, for each subcarrier band and for each symbol group, a vector of features.

The resource elements corresponding to the carrier frequency hopping patterns are gathered, leading to K tensors denoted by $Z_k^{(1)} \in \mathbb{R}^{S \times C}$ and $Z_k^{(2)} \in \mathbb{R}^{S \times C}$, $0 \leq k \leq K-1$, for the first and second neural networks, respectively. This operation may be similar to the gathering operation performed during the preprocessing stage.

The first neural network determines, for every user equipment device user k, a probability that the user equipment device is requesting channel access. This probability is denoted by $\widehat{Pr}(A_k|Y)$. This probability is determined by transforming the tensor $Z_k^{(1)}$ with a multilayer perceptron depicted in FIG. 3C.

Similarly, the second neural network determines, for every user equipment device k, estimates of the time-of-arrival and carrier frequency offset. These estimates are denoted by $\hat{D}_k$ and $\hat{f}_{off,k}$, are determined by transforming the tensor $Z_k^{(2)} \in \mathbb{R}^{S \times C}$ with two separate multilayer perceptrons. For both neural networks, weights sharing may be performed across the K carrier frequency hopping patterns for the multilayer perceptrons, reducing the machine memory requirements needed for the neural network logic.

The computational practicality of utilizing multilayer perceptrons in the neural network structure is enabled by assuming short preamble structures, leading to small values for S. For example, one preamble repetition may correspond to S=4. Long preambles may make the use of multilayer perceptrons computationally prohibitive and may call for utilizing a different architecture, such as the use of pooling or dilatation to reduce the size of the inputs to the multilayer perceptrons. However, the disclosed mechanisms may provide significant improvements in computational efficiency and accuracy that obviate the need for longer preambles in many wireless environments.

In one embodiment, the neural network that predicts probabilities of transmitting user equipment devices may be trained using a binary cross-entropy loss function as follows:

$$L_1 := -\sum_{k=0}^{K-1} \mathbb{E}[\ln(\widehat{Pr}(A_k|Y))] \quad (10)$$

which may be estimated through Monte Carlo sampling by $$L_1 \approx \quad (11)$$
$$-\frac{1}{B}\sum_{b=0}^{B-1}\sum_{k=0}^{K-1}[A_k^{[b]}\ln(\widehat{Pr}(A_k^{[b]}|Y^{[b]})) + (1-A_k^{[b]})\ln(1-\widehat{Pr}(A_k^{[b]}|Y^{[b]}))]$$

where B is the batch size and the superscript [b] refers to the $b^{th}$ batch example.

In one embodiment, the neural network that estimates time-of-arrival and the carrier frequency offset may be trained using a weighted mean squared error loss function as follows:

$$L_2 := \sum_{k=0}^{K-1} \mathbb{E}\left[A_k SNR_k(D_k - \hat{D}_k)^2\right] + \sum_{k=0}^{K-1} \mathbb{E}\left[A_k SNR_k(f_{off,k} - \hat{f}_{off,k})^2\right] \quad (12)$$

$$\text{where } SNR_k := \frac{\beta_k}{\sigma^2}\frac{1}{S}\sum_{m=0}^{S-1}\left|H_k\left(\frac{\phi_k[m]}{N}\right)\right|^2 \quad (13)$$

is the average signal-to-noise ratio of user equipment device k. Weighting by $A_k$ may help ensure that only the active user equipment devices are considered in the loss calculation. Weighting by the signal-to-noise ratio takes into account that the errors measured under high signal-to-noise ratios may be negligible compared to the errors measured under low signal-to-noise ratios. Training with an unweighted mean squared error therefore may result in poor accuracy for high signal-to-noise ratios. The loss $L_2$ may be estimated by $$L_2 \approx \frac{1}{B}\sum_{k=0}^{K-1}\sum_{b=0}^{B-1} A_k^{[b]} SNR_k^{[b]}(D_k^{[b]} - \hat{D}_k^{[b]})^2 + L_3 \quad (14)$$

$$L_3 \approx \frac{1}{B}\sum_{k=0}^{K-1}\sum_{b=0}^{B-1} A_k^{[b]} SNR_k^{[b]}(f_{off,k}^{[b]} - \hat{f}_{off,k}^{[b]})^2 \quad (15)$$

In one embodiment, training of the two neural networks may be jointly performed on the total loss $$L := \alpha L_1 + \beta L_2 + \gamma L_3 \quad (15)$$

where $L_1$, $L_2$, and $L_3$ are loss factors for the user equipment device activity predictions, time-of-arrival, and carrier frequency offset, respectively, and $\alpha$, $\beta$, and $\gamma$ are weights applied to the loss factors.

The mechanisms disclosed herein may be implemented by computing devices utilizing one or more graphic processing unit (GPU) and/or general purpose data processor (e.g., a central processing unit or CPU). Exemplary architectures will now be described that may be configured to implement the mechanisms disclosed herein on such devices.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 4:
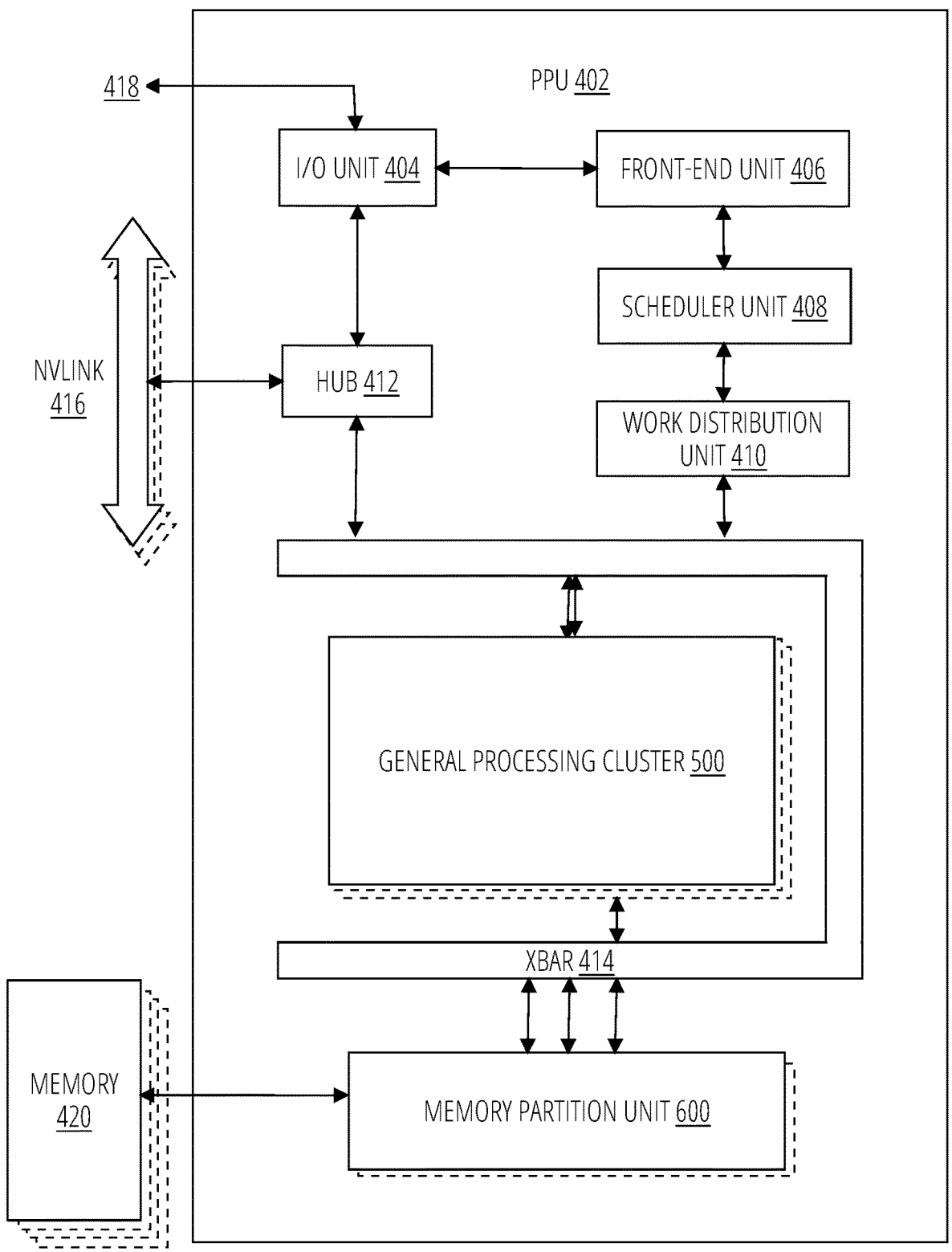
FIG. 4 depicts a parallel processing unit 402 in accordance with one embodiment.

FIG. 4 depicts a parallel processing unit 402, in accordance with an embodiment. In an embodiment, the parallel processing unit 402 is a multi-threaded processor that is implemented on one or more integrated circuit devices. The parallel processing unit 402 is a latency hiding architecture designed to process many threads in parallel. A thread (e.g., a thread of execution) is an instantiation of a set of instructions configured to be executed by the parallel processing unit 402. In an embodiment, the parallel processing unit 402 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 402 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 402 modules may be configured to accelerate thousands of High Performance Computing (HPC), data center, and machine learning applications. The parallel processing unit 402 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the parallel processing unit 402 includes an I/O unit 404, a front-end unit 406, a scheduler unit 408, a work distribution unit 410, a hub 412, a crossbar 414, one or more general processing cluster 500 modules, and one or more memory partition unit 600 modules. The parallel processing unit 402 may be connected to a host processor or other parallel processing unit 402 modules via one or more high-speed NVLink 416 interconnects. The parallel processing unit 402 may be connected to a host processor or other peripheral devices via an interconnect 418. The parallel processing unit 402 may also be connected to a local memory comprising a number of memory 420 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 420 may comprise logic to configure the parallel processing unit 402 to carry out aspects of the techniques disclosed herein.

The NVLink 416 interconnect enables systems to scale and include one or more parallel processing unit 402 modules combined with one or more CPUs, supports cache coherence between the parallel processing unit 402 modules and CPUs, and CPU mastering. Data and/or commands may be transmitted by the NVLink 416 through the hub 412 to/from other units of the parallel processing unit 402 such as one or more copy engines, a video encoder, a video decoder, a power management unit, etc. (not explicitly shown). The NVLink 416 is described in more detail in conjunction with FIG. 8.

The I/O unit 404 is configured to transmit and receive communications (e.g., commands, data, etc.) from a host processor (not shown) over the interconnect 418. The I/O unit 404 may communicate with the host processor directly via the interconnect 418 or through one or more intermediate devices such as a memory bridge. In an embodiment, the I/O unit 404 may communicate with one or more other processors, such as one or more parallel processing unit 402 modules via the interconnect 418. In an embodiment, the I/O unit 404 implements a Peripheral Component Interconnect Express (PCIe) interface for communications over a PCIe bus and the interconnect 418 is a PCIe bus. In alternative embodiments, the I/O unit 404 may implement other types of well-known interfaces for communicating with external devices.

The I/O unit 404 decodes packets received via the interconnect 418. In an embodiment, the packets represent commands configured to cause the parallel processing unit 402 to perform various operations. The I/O unit 404 transmits the decoded commands to various other units of the parallel processing unit 402 as the commands may specify. For example, some commands may be transmitted to the front-end unit 406. Other commands may be transmitted to the hub 412 or other units of the parallel processing unit 402 such as one or more copy engines, a video encoder, a video decoder, a power management unit, etc. (not explicitly shown). In other words, the I/O unit 404 is configured to route communications between and among the various logical units of the parallel processing unit 402.

In an embodiment, a program executed by the host processor encodes a command stream in a buffer that provides workloads to the parallel processing unit 402 for processing. A workload may comprise several instructions and data to be processed by those instructions. The buffer is a region in a memory that is accessible (e.g., read/write) by both the host processor and the parallel processing unit 402. For example, the I/O unit 404 may be configured to access the buffer in a system memory connected to the interconnect 418 via memory requests transmitted over the interconnect 418. In an embodiment, the host processor writes the command stream to the buffer and then transmits a pointer to the start of the command stream to the parallel processing unit 402. The front-end unit 406 receives pointers to one or more command streams. The front-end unit 406 manages the one or more streams, reading commands from the streams and forwarding commands to the various units of the parallel processing unit 402.

The front-end unit 406 is coupled to a scheduler unit 408 that configures the various general processing cluster 500 modules to process tasks defined by the one or more streams. The scheduler unit 408 is configured to track state information related to the various tasks managed by the scheduler unit 408. The state may indicate which general processing cluster 500 a task is assigned to, whether the task is active or inactive, a priority level associated with the task, and so forth. The scheduler unit 408 manages the execution of a plurality of tasks on the one or more general processing cluster 500 modules.

The scheduler unit 408 is coupled to a work distribution unit 410 that is configured to dispatch tasks for execution on the general processing cluster 500 modules. The work distribution unit 410 may track a number of scheduled tasks received from the scheduler unit 408. In an embodiment, the work distribution unit 410 manages a pending task pool and an active task pool for each of the general processing cluster 500 modules. The pending task pool may comprise a number of slots (e.g., 32 slots) that contain tasks assigned to be processed by a particular general processing cluster 500. The active task pool may comprise a number of slots (e.g., 4 slots) for tasks that are actively being processed by the general processing cluster 500 modules. As a general processing cluster 500 finishes the execution of a task, that task is evicted from the active task pool for the general processing cluster 500 and one of the other tasks from the pending task pool is selected and scheduled for execution on the general processing cluster 500. If an active task has been idle on the general processing cluster 500, such as while waiting for a data dependency to be resolved, then the active task may be evicted from the general processing cluster 500 and returned to the pending task pool while another task in the pending task pool is selected and scheduled for execution on the general processing cluster 500.

The work distribution unit 410 communicates with the one or more general processing cluster 500 modules via crossbar 414. The crossbar 414 is an interconnect network that couples many of the units of the parallel processing unit 402 to other units of the parallel processing unit 402. For example, the crossbar 414 may be configured to couple the work distribution unit 410 to a particular general processing cluster 500. Although not shown explicitly, one or more other units of the parallel processing unit 402 may also be connected to the crossbar 414 via the hub 412.

The tasks are managed by the scheduler unit 408 and dispatched to a general processing cluster 500 by the work distribution unit 410. The general processing cluster 500 is configured to process the task and generate results. The results may be consumed by other tasks within the general processing cluster 500, routed to a different general processing cluster 500 via the crossbar 414, or stored in the memory 420. The results can be written to the memory 420 via the memory partition unit 600 modules, which implement a memory interface for reading and writing data to/from the memory 420. The results can be transmitted to another parallel processing unit 402 or CPU via the NVLink 416. In an embodiment, the parallel processing unit 402 includes a number U of memory partition unit 600 modules that is equal to the number of separate and distinct memory 420 devices coupled to the parallel processing unit 402. A memory partition unit 600 will be described in more detail below in conjunction with FIG. 6.

In an embodiment, a host processor executes a driver kernel that implements an application programming interface (API) that enables one or more applications executing on the host processor to schedule operations for execution on the parallel processing unit 402. In an embodiment, multiple compute applications are simultaneously executed by the parallel processing unit 402 and the parallel processing unit 402 provides isolation, quality of service (QoS), and independent address spaces for the multiple compute applications. An application may generate instructions (e.g., API calls) that cause the driver kernel to generate one or more tasks for execution by the parallel processing unit 402. The driver kernel outputs tasks to one or more streams being processed by the parallel processing unit 402. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 7.

Figure 5:
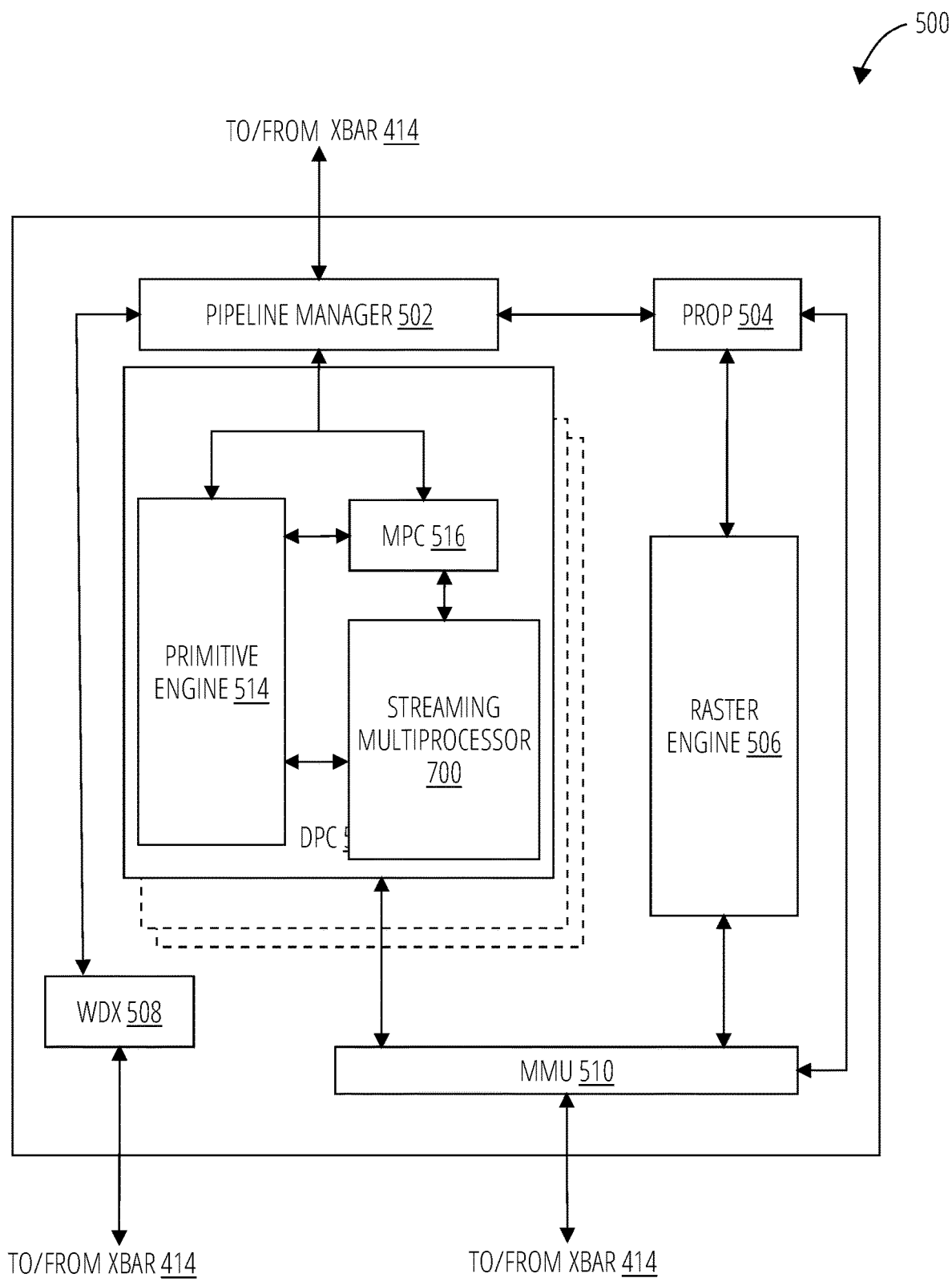
FIG. 5 depicts a general processing cluster 500 in accordance with one embodiment.

FIG. 5 depicts a general processing cluster 500 of the parallel processing unit 402 of FIG. 4, in accordance with an embodiment. As shown in FIG. 5, each general processing cluster 500 includes a number of hardware units for processing tasks. In an embodiment, each general processing cluster 500 includes a pipeline manager 502, a pre-raster operations unit 504, a raster engine 506, a work distribution crossbar 508, a memory management unit 510, and one or more data processing cluster 512. It will be appreciated that the general processing cluster 500 of FIG. 5 may include other hardware units in lieu of or in addition to the units shown in FIG. 5.

In an embodiment, the operation of the general processing cluster 500 is controlled by the pipeline manager 502. The pipeline manager 502 manages the configuration of the one or more data processing cluster 512 modules for processing tasks allocated to the general processing cluster 500. In an embodiment, the pipeline manager 502 may configure at least one of the one or more data processing cluster 512 modules to implement at least a portion of a graphics rendering pipeline. For example, a data processing cluster 512 may be configured to execute a vertex shader program on the programmable streaming multiprocessor 700. The pipeline manager 502 may also be configured to route packets received from the work distribution unit 410 to the appropriate logical units within the general processing cluster 500. For example, some packets may be routed to fixed function hardware units in the pre-raster operations unit 504 and/or raster engine 506 while other packets may be routed to the data processing cluster 512 modules for processing by the primitive engine 514 or the streaming multiprocessor 700. In an embodiment, the pipeline manager 502 may configure at least one of the one or more data processing cluster 512 modules to implement a neural network model and/or a computing pipeline.

Figure 6:
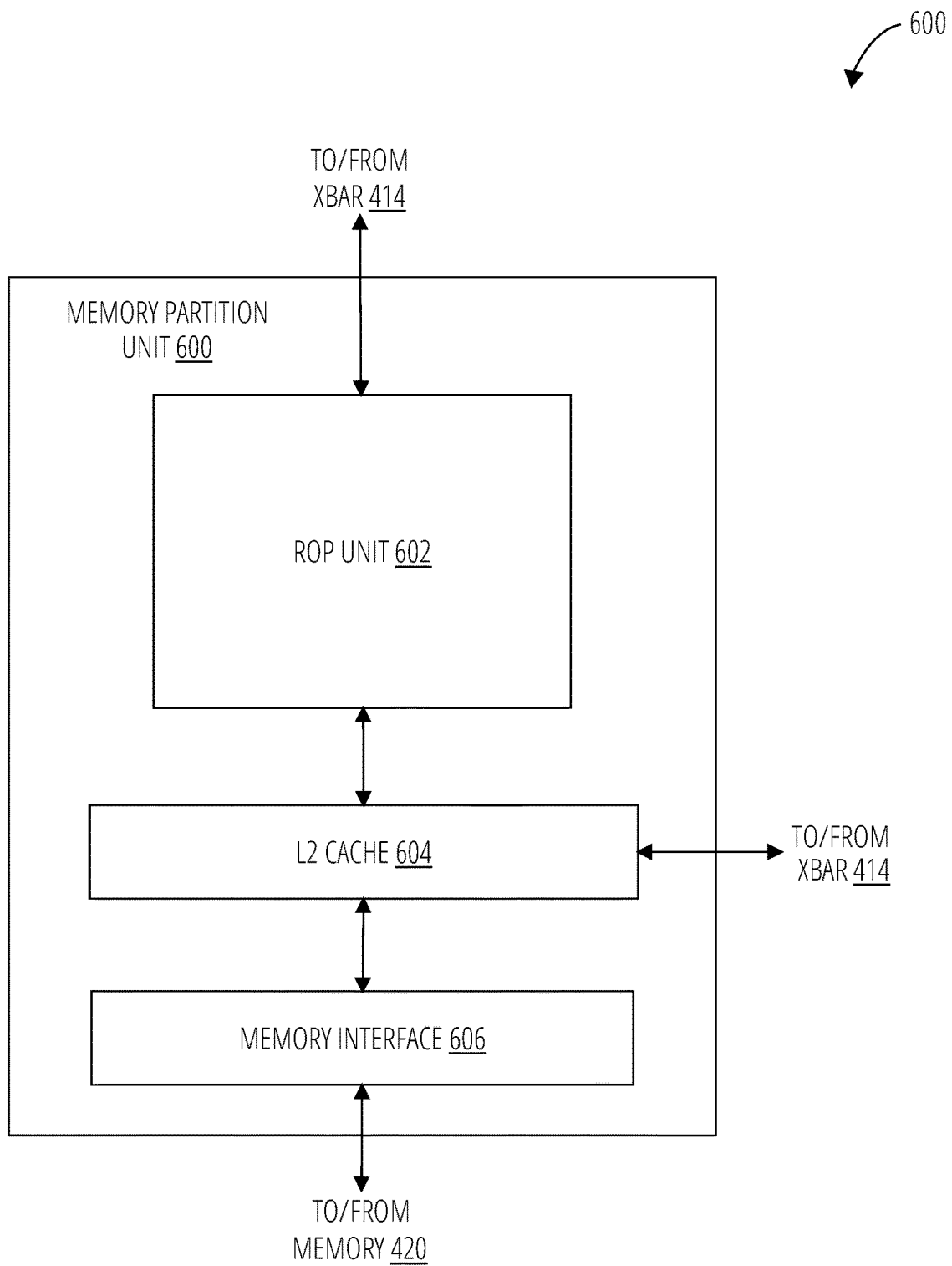
FIG. 6 depicts a memory partition unit 600 in accordance with one embodiment.

The pre-raster operations unit 504 is configured to route data generated by the raster engine 506 and the data processing cluster 512 modules to a Raster Operations (ROP) unit, described in more detail in conjunction with FIG. 6. The pre-raster operations unit 504 may also be configured to perform optimizations for color blending, organize pixel data, perform address translations, and the like.

The raster engine 506 includes a number of fixed function hardware units configured to perform various raster operations. In an embodiment, the raster engine 506 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 506 comprises fragments to be processed, for example, by a fragment shader implemented within a data processing cluster 512.

Each data processing cluster 512 included in the general processing cluster 500 includes an M-pipe controller 516, a primitive engine 514, and one or more streaming multiprocessor 700 modules. The M-pipe controller 516 controls the operation of the data processing cluster 512, routing packets received from the pipeline manager 502 to the appropriate units in the data processing cluster 512. For example, packets associated with a vertex may be routed to the primitive engine 514, which is configured to fetch vertex attributes associated with the vertex from the memory 420. In contrast, packets associated with a shader program may be transmitted to the streaming multiprocessor 700.

The streaming multiprocessor 700 comprises a programmable streaming processor that is configured to process tasks represented by a number of threads. Each streaming multiprocessor 700 is multi-threaded and configured to execute a plurality of threads (e.g., 32 threads) from a particular group of threads concurrently. In an embodiment, the streaming multiprocessor 700 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 700 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 700 will be described in more detail below in conjunction with FIG. 7.

The memory management unit 510 provides an interface between the general processing cluster 500 and the memory partition unit 600. The memory management unit 510 may provide translation of virtual addresses into physical addresses, memory protection, and arbitration of memory requests. In an embodiment, the memory management unit 510 provides one or more translation lookaside buffers (TLBs) for performing translation of virtual addresses into physical addresses in the memory 420.

FIG. 6 depicts a memory partition unit 600 of the parallel processing unit 402 of FIG. 4, in accordance with an embodiment. As shown in FIG. 6, the memory partition unit 600 includes a raster operations unit 602, a level two cache 604, and a memory interface 606. The memory interface 606 is coupled to the memory 420. Memory interface 606 may implement 32, 64, 128, 1024-bit data buses, or the like, for high-speed data transfer. In an embodiment, the parallel processing unit 402 incorporates U memory interface 606 modules, one memory interface 606 per pair of memory partition unit 600 modules, where each pair of memory partition unit 600 modules is connected to a corresponding memory 420 device. For example, parallel processing unit 402 may be connected to up to Y memory 420 devices, such as high bandwidth memory stacks or graphics double-data-rate, version 5, synchronous dynamic random access memory, or other types of persistent storage.

In an embodiment, the memory interface 606 implements an HBM2 memory interface and Y equals half U. In an embodiment, the HBM2 memory stacks are located on the same physical package as the parallel processing unit 402, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 420 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 402 modules process very large datasets and/or run applications for extended periods.

In an embodiment, the parallel processing unit 402 implements a multi-level memory hierarchy. In an embodiment, the memory partition unit 600 supports a unified memory to provide a single unified virtual address space for CPU and parallel processing unit 402 memory, enabling data sharing between virtual memory systems. In an embodiment the frequency of accesses by a parallel processing unit 402 to memory located on other processors is traced to ensure that memory pages are moved to the physical memory of the parallel processing unit 402 that is accessing the pages more frequently. In an embodiment, the NVLink 416 supports address translation services allowing the parallel processing unit 402 to directly access a CPU's page tables and providing full access to CPU memory by the parallel processing unit 402.

In an embodiment, copy engines transfer data between multiple parallel processing unit 402 modules or between parallel processing unit 402 modules and CPUs. The copy engines can generate page faults for addresses that are not mapped into the page tables. The memory partition unit 600 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 420 or other system memory may be fetched by the memory partition unit 600 and stored in the level two cache 604, which is located on-chip and is shared between the various general processing cluster 500 modules. As shown, each memory partition unit 600 includes a portion of the level two cache 604 associated with a corresponding memory 420 device. Lower level caches may then be implemented in various units within the general processing cluster 500 modules. For example, each of the streaming multiprocessor 700 modules may implement an L1 cache. The L1 cache is private memory that is dedicated to a particular streaming multiprocessor 700. Data from the level two cache 604 may be fetched and stored in each of the L1 caches for processing in the functional units of the streaming multiprocessor 700 modules. The level two cache 604 is coupled to the memory interface 606 and the crossbar 414.

The raster operations unit 602 performs graphics raster operations related to pixel color, such as color compression, pixel blending, and the like. The raster operations unit 602 also implements depth testing in conjunction with the raster engine 506, receiving a depth for a sample location associated with a pixel fragment from the culling engine of the raster engine 506. The depth is tested against a corresponding depth in a depth buffer for a sample location associated with the fragment. If the fragment passes the depth test for the sample location, then the raster operations unit 602 updates the depth buffer and transmits a result of the depth test to the raster engine 506. It will be appreciated that the number of partition memory partition unit 600 modules may be different than the number of general processing cluster 500 modules and, therefore, each raster operations unit 602 may be coupled to each of the general processing cluster 500 modules. The raster operations unit 602 tracks packets received from the different general processing cluster 500 modules and determines which general processing cluster 500 that a result generated by the raster operations unit 602 is routed to through the crossbar 414. Although the raster operations unit 602 is included within the memory partition unit 600 in FIG. 6, in other embodiment, the raster operations unit 602 may be outside of the memory partition unit 600. For example, the raster operations unit 602 may reside in the general processing cluster 500 or another unit.

Figure 7:
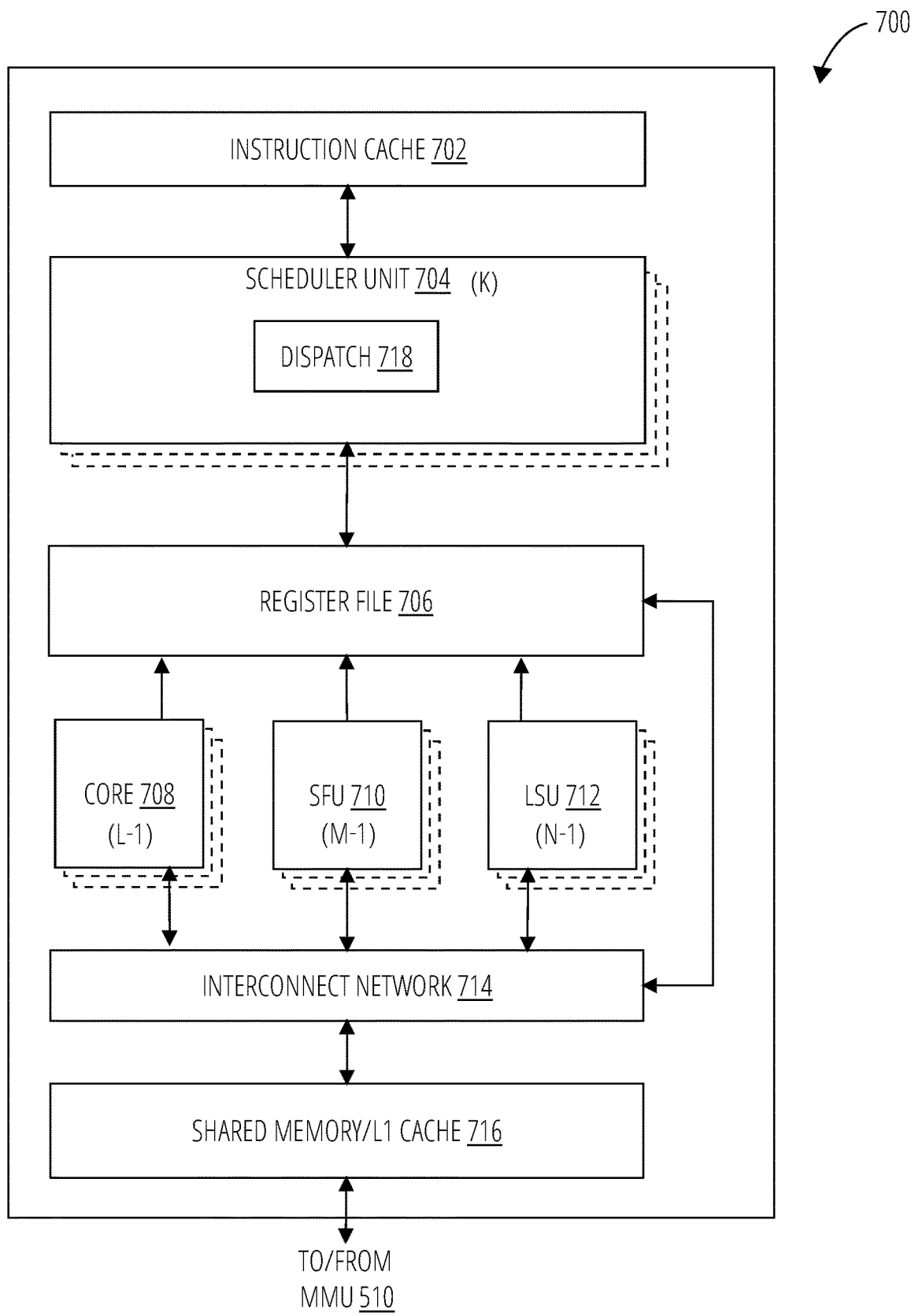
FIG. 7 depicts a streaming multiprocessor 700 in accordance with one embodiment.

FIG. 7 illustrates the streaming multiprocessor 700 of FIG. 5, in accordance with an embodiment. As shown in FIG. 7, the streaming multiprocessor 700 includes an instruction cache 702, one or more scheduler unit 704 modules (e.g., such as scheduler unit 408), a register file 706, one or more processing core 708 modules, one or more special function unit 710 modules, one or more load/store unit 712 modules, an interconnect network 714, and a shared memory/L1 cache 716.

As described above, the work distribution unit 410 dispatches tasks for execution on the general processing cluster 500 modules of the parallel processing unit 402. The tasks are allocated to a particular data processing cluster 512 within a general processing cluster 500 and, if the task is associated with a shader program, the task may be allocated to a streaming multiprocessor 700. The scheduler unit 408 receives the tasks from the work distribution unit 410 and manages instruction scheduling for one or more thread blocks assigned to the streaming multiprocessor 700. The scheduler unit 704 schedules thread blocks for execution as warps of parallel threads, where each thread block is allocated at least one warp. In an embodiment, each warp executes 32 threads. The scheduler unit 704 may manage a plurality of different thread blocks, allocating the warps to the different thread blocks and then dispatching instructions from the plurality of different cooperative groups to the various functional units (e.g., core 708 modules, special function unit 710 modules, and load/store unit 712 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 718 unit is configured within the scheduler unit 704 to transmit instructions to one or more of the functional units. In one embodiment, the scheduler unit 704 includes two dispatch 718 units that enable two different instructions from the same warp to be dispatched during each clock cycle. In alternative embodiments, each scheduler unit 704 may include a single dispatch 718 unit or additional dispatch 718 units.

Each streaming multiprocessor 700 includes a register file 706 that provides a set of registers for the functional units of the streaming multiprocessor 700. In an embodiment, the register file 706 is divided between each of the functional units such that each functional unit is allocated a dedicated portion of the register file 706. In another embodiment, the register file 706 is divided between the different warps being executed by the streaming multiprocessor 700. The register file 706 provides temporary storage for operands connected to the data paths of the functional units.

Each streaming multiprocessor 700 comprises L processing core 708 modules. In an embodiment, the streaming multiprocessor 700 includes a large number (e.g., 128, etc.) of distinct processing core 708 modules. Each core 708 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 708 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 708 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 700 also comprises M special function unit 710 modules that perform special functions (e.g., attribute evaluation, reciprocal square root, and the like). In an embodiment, the special function unit 710 modules may include a tree traversal unit configured to traverse a hierarchical tree data structure. In an embodiment, the special function unit 710 modules may include texture unit configured to perform texture map filtering operations. In an embodiment, the texture units are configured to load texture maps (e.g., a 2D array of texels) from the memory 420 and sample the texture maps to produce sampled texture values for use in shader programs executed by the streaming multiprocessor 700. In an embodiment, the texture maps are stored in the shared memory/L1 cache 716. The texture units implement texture operations such as filtering operations using mip-maps (e.g., texture maps of varying levels of detail). In an embodiment, each streaming multiprocessor 700 includes two texture units.

Each streaming multiprocessor 700 also comprises N load/store unit 712 modules that implement load and store operations between the shared memory/L1 cache 716 and the register file 706. Each streaming multiprocessor 700 includes an interconnect network 714 that connects each of the functional units to the register file 706 and the load/store unit 712 to the register file 706 and shared memory/L1 cache 716. In an embodiment, the interconnect network 714 is a crossbar that can be configured to connect any of the functional units to any of the registers in the register file 706 and connect the load/store unit 712 modules to the register file 706 and memory locations in shared memory/L1 cache 716.

The shared memory/L1 cache 716 is an array of on-chip memory that allows for data storage and communication between the streaming multiprocessor 700 and the primitive engine 514 and between threads in the streaming multiprocessor 700. In an embodiment, the shared memory/L1 cache 716 comprises 128 KB of storage capacity and is in the path from the streaming multiprocessor 700 to the memory partition unit 600. The shared memory/L1 cache 716 can be used to cache reads and writes. One or more of the shared memory/L1 cache 716, level two cache 604, and memory 420 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 716 enables the shared memory/L1 cache 716 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 4, are bypassed, creating a much simpler programming model. In the general purpose parallel computation configuration, the work distribution unit 410 assigns and distributes blocks of threads directly to the data processing cluster 512 modules. The threads in a block execute the same program, using a unique thread ID in the calculation to ensure each thread generates unique results, using the streaming multiprocessor 700 to execute the program and perform calculations, shared memory/L1 cache 716 to communicate between threads, and the load/store unit 712 to read and write global memory through the shared memory/L1 cache 716 and the memory partition unit 600. When configured for general purpose parallel computation, the streaming multiprocessor 700 can also write commands that the scheduler unit 408 can use to launch new work on the data processing cluster 512 modules.

The parallel processing unit 402 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 402 is embodied on a single semiconductor substrate. In another embodiment, the parallel processing unit 402 is included in a system-on-a-chip (SoC) along with one or more other devices such as additional parallel processing unit 402 modules, the memory 420, a reduced instruction set computer (RISC) CPU, a memory management unit (MMU), a digital-to-analog converter (DAC), and the like.

In an embodiment, the parallel processing unit 402 may be included on a graphics card that includes one or more memory devices. The graphics card may be configured to interface with a PCIe slot on a motherboard of a desktop computer. In yet another embodiment, the parallel processing unit 402 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 8:
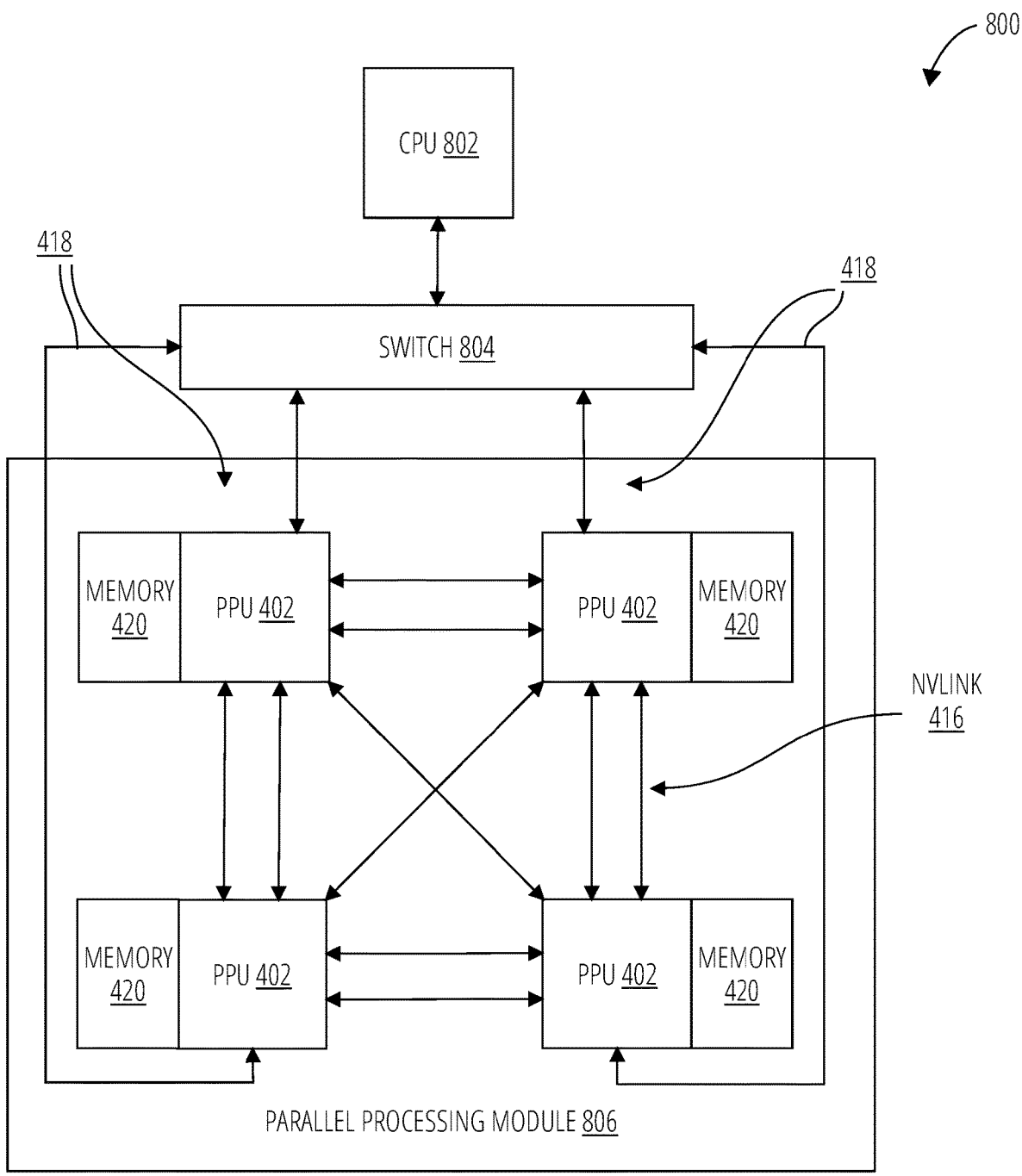
FIG. 8 depicts a processing system 800 in accordance with one embodiment.

FIG. 8 is a conceptual diagram of a processing system 800 implemented using the parallel processing unit 402 of FIG. 4, in accordance with an embodiment. The processing system 800 includes a central processing unit 802, switch 804, and multiple parallel processing unit 402 modules each and respective memory 420 modules. The NVLink 416 provides high-speed communication links between each of the parallel processing unit 402 modules. Although a particular number of NVLink 416 and interconnect 418 connections are illustrated in FIG. 8, the number of connections to each parallel processing unit 402 and the central processing unit 802 may vary. The switch 804 interfaces between the interconnect 418 and the central processing unit 802. The parallel processing unit 402 modules, memory 420 modules, and NVLink 416 connections may be situated on a single semiconductor platform to form a parallel processing module 806. In an embodiment, the switch 804 supports two or more protocols to interface between various different connections and/or links.

In another embodiment (not shown), the NVLink 416 provides one or more high-speed communication links between each of the parallel processing unit modules (parallel processing unit 402, parallel processing unit 402, parallel processing unit 402, and parallel processing unit 402) and the central processing unit 802 and the switch 804 interfaces between the interconnect 418 and each of the parallel processing unit modules. The parallel processing unit modules, memory 420 modules, and interconnect 418 may be situated on a single semiconductor platform to form a parallel processing module 806. In yet another embodiment (not shown), the interconnect 418 provides one or more communication links between each of the parallel processing unit modules and the central processing unit 802 and the switch 804 interfaces between each of the parallel processing unit modules using the NVLink 416 to provide one or more high-speed communication links between the parallel processing unit modules. In another embodiment (not shown), the NVLink 416 provides one or more high-speed communication links between the parallel processing unit modules and the central processing unit 802 through the switch 804. In yet another embodiment (not shown), the interconnect 418 provides one or more communication links between each of the parallel processing unit modules directly. One or more of the NVLink 416 high-speed communication links may be implemented as a physical NVLink interconnect or either an on-chip or on-die interconnect using the same protocol as the NVLink 416.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 806 may be implemented as a circuit board substrate and each of the parallel processing unit modules and/or memory 420 modules may be packaged devices. In an embodiment, the central processing unit 802, switch 804, and the parallel processing module 806 are situated on a single semiconductor platform.

In an embodiment, the signaling rate of each NVLink 416 is 20 to 25 Gigabits/second and each parallel processing unit module includes six NVLink 416 interfaces (as shown in FIG. 8, five NVLink 416 interfaces are included for each parallel processing unit module). Each NVLink 416 provides a data transfer rate of 25 Gigabytes/second in each direction, with six links providing 300 Gigabytes/second. The NVLink 416 can be used exclusively for PPU-to-PPU communication as shown in FIG. 8, or some combination of PPU-to-PPU and PPU-to-CPU, when the central processing unit 802 also includes one or more NVLink 416 interfaces.

In an embodiment, the NVLink 416 allows direct load/store/atomic access from the central processing unit 802 to each parallel processing unit module's memory 420. In an embodiment, the NVLink 416 supports coherency operations, allowing data read from the memory 420 modules to be stored in the cache hierarchy of the central processing unit 802, reducing cache access latency for the central processing unit 802. In an embodiment, the NVLink 416 includes support for Address Translation Services (ATS), enabling the parallel processing unit module to directly access page tables within the central processing unit 802. One or more of the NVLink 416 may also be configured to operate in a low-power mode.

Figure 9:
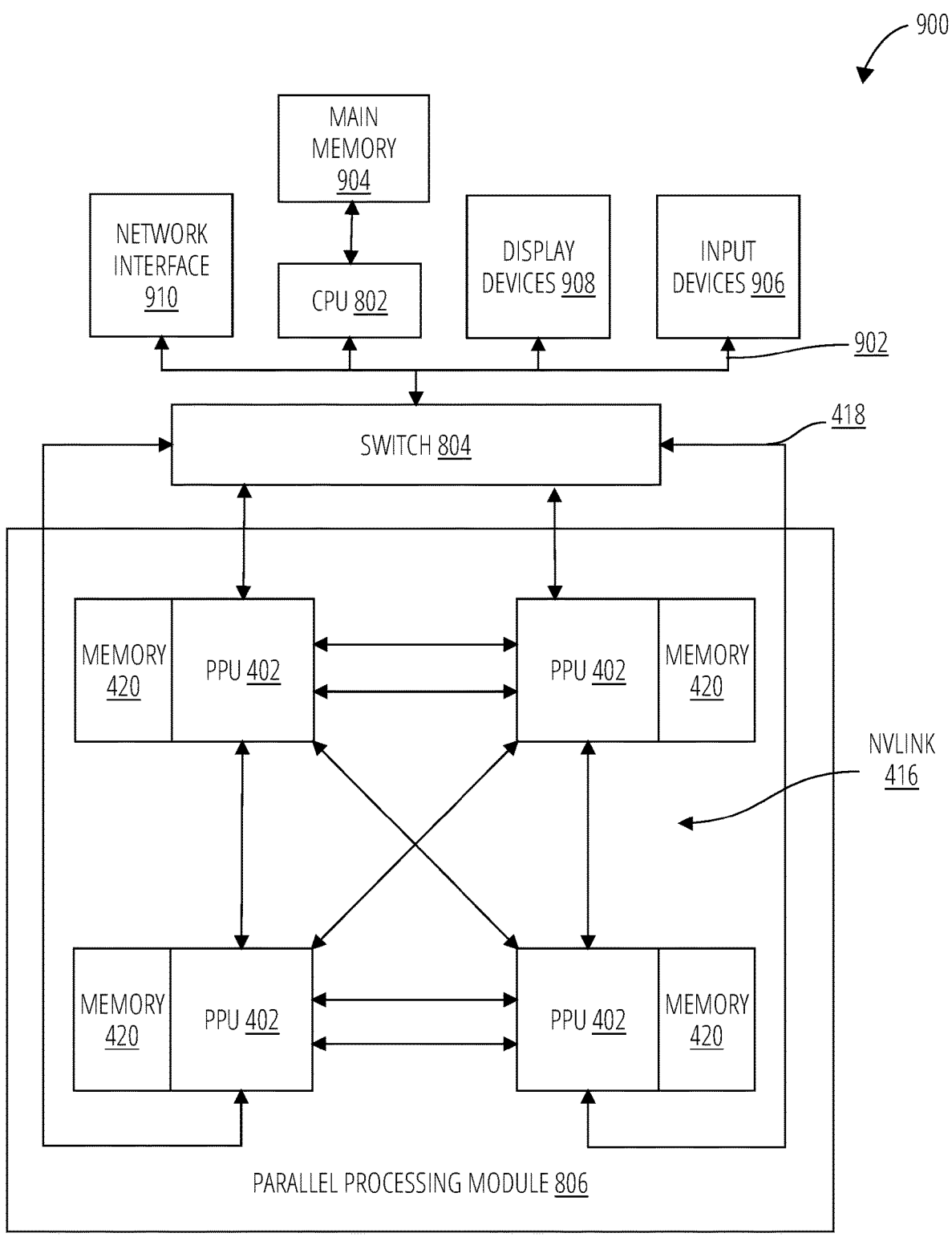
FIG. 9 depicts an exemplary processing system 900 in accordance with another embodiment.

FIG. 9 depicts an exemplary processing system 900 in which the various architecture and/or functionality of the various previous embodiments may be implemented. As shown, an exemplary processing system 900 is provided including at least one central processing unit 802 that is connected to a communications bus 902. The communication communications bus 902 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 900 also includes a main memory 904. Control logic (software) and data are stored in the main memory 904 which may take the form of random access memory (RAM).

The exemplary processing system 900 also includes input devices 906, the parallel processing module 806, and display devices 908, e.g. a conventional CRT (cathode ray tube), LCD (liquid crystal display), LED (light emitting diode), plasma display or the like. User input may be received from the input devices 906, e.g., keyboard, mouse, touchpad, microphone, and the like. Each of the foregoing modules and/or devices may even be situated on a single semiconductor platform to form the exemplary processing system 900. Alternately, the various modules may also be situated separately or in various combinations of semiconductor platforms per the desires of the user.

Further, the exemplary processing system 900 may be coupled to a network (e.g., a telecommunications network, local area network (LAN), wireless network, wide area network (WAN) such as the Internet, peer-to-peer network, cable network, or the like) through a network interface 910 for communication purposes.

The exemplary processing system 900 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage. Such computer programs, when executed, enable the exemplary processing system 900 to perform various functions. The main memory 904, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 900 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 10:
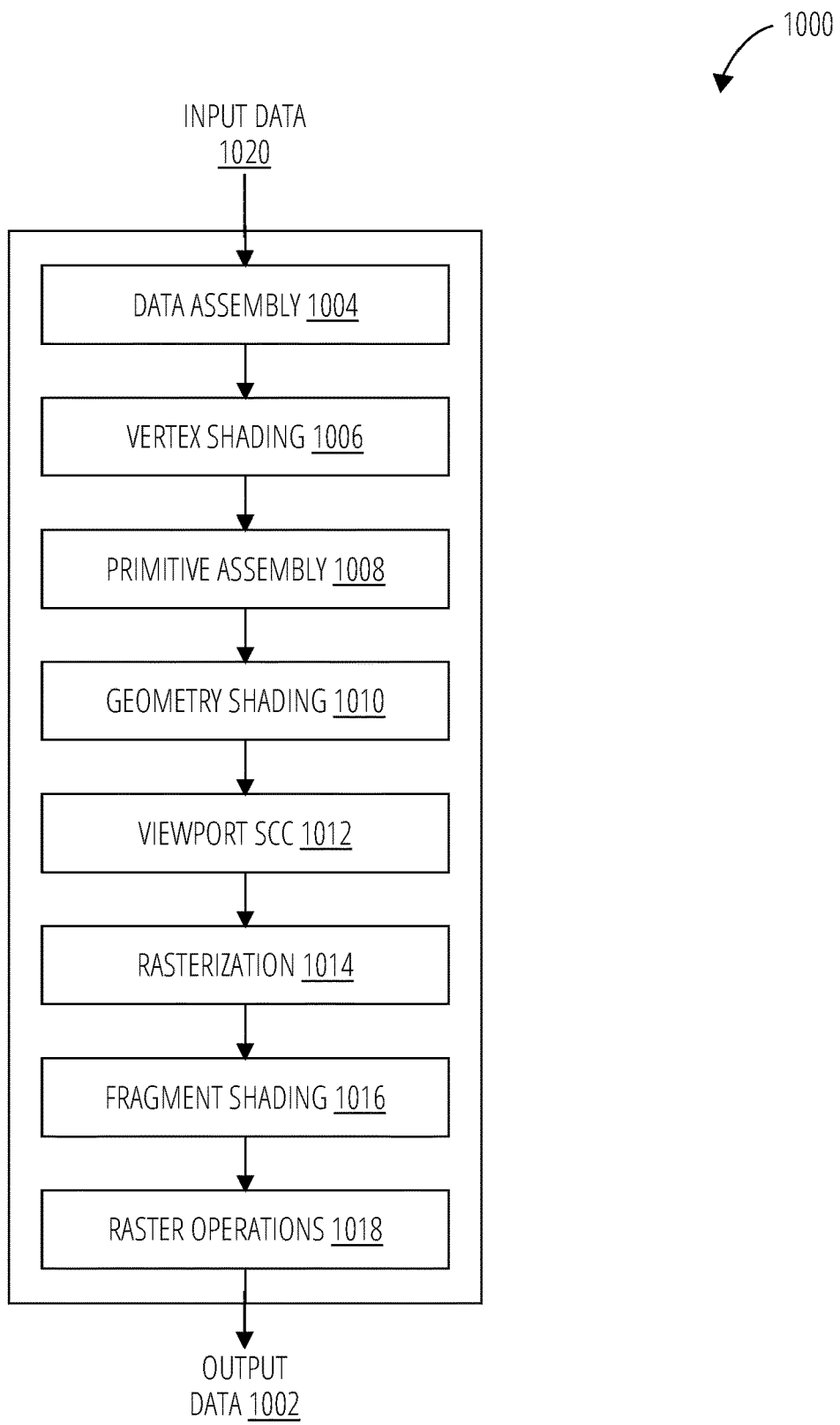
FIG. 10 depicts a graphics processing pipeline 1000 in accordance with one embodiment.

FIG. 10 is a conceptual diagram of a graphics processing pipeline 1000 implemented by the parallel processing unit 402 of FIG. 4, in accordance with an embodiment. In an embodiment, the parallel processing unit 402 comprises a graphics processing unit (GPU). The parallel processing unit 402 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 402 can be configured to process the graphics primitives to generate a frame buffer (e.g., pixel data for each of the pixels of the display).

An application writes model data for a scene (e.g., a collection of vertices and attributes) to a memory such as a system memory or memory 420. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 700 modules of the parallel processing unit 402 including one or more of a vertex shader, hull shader, domain shader, geometry shader, and a pixel shader. For example, one or more of the streaming multiprocessor 700 modules may be configured to execute a vertex shader program that processes a number of vertices defined by the model data. In an embodiment, the different streaming multiprocessor 700 modules may be configured to execute different shader programs concurrently. For example, a first subset of streaming multiprocessor 700 modules may be configured to execute a vertex shader program while a second subset of streaming multiprocessor 700 modules may be configured to execute a pixel shader program. The first subset of streaming multiprocessor 700 modules processes vertex data to produce processed vertex data and writes the processed vertex data to the level two cache 604 and/or the memory 420. After the processed vertex data is rasterized (e.g., transformed from three-dimensional data into two-dimensional data in screen space) to produce fragment data, the second subset of streaming multiprocessor 700 modules executes a pixel shader to produce processed fragment data, which is then blended with other processed fragment data and written to the frame buffer in memory 420. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1000 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1000 receives input data 601 that is transmitted from one stage to the next stage of the graphics processing pipeline 1000 to generate output data 1002. In an embodiment, the graphics processing pipeline 1000 may represent a graphics processing pipeline defined by the OpenGL® API. As an option, the graphics processing pipeline 1000 may be implemented in the context of the functionality and architecture of the previous Figures and/or any subsequent Figure(s).

As shown in FIG. 10, the graphics processing pipeline 1000 comprises a pipeline architecture that includes a number of stages. The stages include, but are not limited to, a data assembly 1004 stage, a vertex shading 1006 stage, a primitive assembly 1008 stage, a geometry shading 1010 stage, a viewport SCC 1012 stage, a rasterization 1014 stage, a fragment shading 1016 stage, and a raster operations 1018 stage. In an embodiment, the input data 1020 comprises commands that configure the processing units to implement the stages of the graphics processing pipeline 1000 and geometric primitives (e.g., points, lines, triangles, quads, triangle strips or fans, etc.) to be processed by the stages. The output data 1002 may comprise pixel data (e.g., color data) that is copied into a frame buffer or other type of surface data structure in a memory.

The data assembly 1004 stage receives the input data 1020 that specifies vertex data for high-order surfaces, primitives, or the like. The data assembly 1004 stage collects the vertex data in a temporary storage or queue, such as by receiving a command from the host processor that includes a pointer to a buffer in memory and reading the vertex data from the buffer. The vertex data is then transmitted to the vertex shading 1006 stage for processing.

The vertex shading 1006 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1006 stage may manipulate individual vertex attributes such as position, color, texture coordinates, and the like. In other words, the vertex shading 1006 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1006 stage generates transformed vertex data that is transmitted to the primitive assembly 1008 stage.

The primitive assembly 1008 stage collects vertices output by the vertex shading 1006 stage and groups the vertices into geometric primitives for processing by the geometry shading 1010 stage. For example, the primitive assembly 1008 stage may be configured to group every three consecutive vertices as a geometric primitive (e.g., a triangle) for transmission to the geometry shading 1010 stage. In some embodiments, specific vertices may be reused for consecutive geometric primitives (e.g., two consecutive triangles in a triangle strip may share two vertices). The primitive assembly 1008 stage transmits geometric primitives (e.g., a collection of associated vertices) to the geometry shading 1010 stage.

The geometry shading 1010 stage processes geometric primitives by performing a set of operations (e.g., a geometry shader or program) on the geometric primitives. Tessellation operations may generate one or more geometric primitives from each geometric primitive. In other words, the geometry shading 1010 stage may subdivide each geometric primitive into a finer mesh of two or more geometric primitives for processing by the rest of the graphics processing pipeline 1000. The geometry shading 1010 stage transmits geometric primitives to the viewport SCC 1012 stage.

In an embodiment, the graphics processing pipeline 1000 may operate within a streaming multiprocessor and the vertex shading 1006 stage, the primitive assembly 1008 stage, the geometry shading 1010 stage, the fragment shading 1016 stage, and/or hardware/software associated therewith, may sequentially perform processing operations. Once the sequential processing operations are complete, in an embodiment, the viewport SCC 1012 stage may utilize the data. In an embodiment, primitive data processed by one or more of the stages in the graphics processing pipeline 1000 may be written to a cache (e.g. L1 cache, a vertex cache, etc.). In this case, in an embodiment, the viewport SCC 1012 stage may access the data in the cache. In an embodiment, the viewport SCC 1012 stage and the rasterization 1014 stage are implemented as fixed function circuitry.

The viewport SCC 1012 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1014 stage.

The rasterization 1014 stage converts the 3D geometric primitives into 2D fragments (e.g. capable of being utilized for display, etc.). The rasterization 1014 stage may be configured to utilize the vertices of the geometric primitives to setup a set of plane equations from which various attributes can be interpolated. The rasterization 1014 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1014 stage generates fragment data (e.g., interpolated vertex attributes associated with a particular sample location for each covered pixel) that are transmitted to the fragment shading 1016 stage.

The fragment shading 1016 stage processes fragment data by performing a set of operations (e.g., a fragment shader or a program) on each of the fragments. The fragment shading 1016 stage may generate pixel data (e.g., color values) for the fragment such as by performing lighting operations or sampling texture maps using interpolated texture coordinates for the fragment. The fragment shading 1016 stage generates pixel data that is transmitted to the raster operations 1018 stage.

The raster operations 1018 stage may perform various operations on the pixel data such as performing alpha tests, stencil tests, and blending the pixel data with other pixel data corresponding to other fragments associated with the pixel. When the raster operations 1018 stage has finished processing the pixel data (e.g., the output data 1002), the pixel data may be written to a render target such as a frame buffer, a color buffer, or the like.

It will be appreciated that one or more additional stages may be included in the graphics processing pipeline 1000 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1010 stage). Other types of graphics processing pipelines are contemplated as being within the scope of the present disclosure. Furthermore, any of the stages of the graphics processing pipeline 1000 may be implemented by one or more dedicated hardware units within a graphics processor such as parallel processing unit 402. Other stages of the graphics processing pipeline 1000 may be implemented by programmable hardware units such as the streaming multiprocessor 700 of the parallel processing unit 402.

The graphics processing pipeline 1000 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 402. The API provides an abstraction for a programmer that lets a programmer utilize specialized graphics hardware, such as the parallel processing unit 402, to generate the graphical data without requiring the programmer to utilize the specific instruction set for the parallel processing unit 402. The application may include an API call that is routed to the device driver for the parallel processing unit 402. The device driver interprets the API call and performs various operations to respond to the API call. In some instances, the device driver may perform operations by executing instructions on the CPU. In other instances, the device driver may perform operations, at least in part, by launching operations on the parallel processing unit 402 utilizing an input/output interface between the CPU and the parallel processing unit 402. In an embodiment, the device driver is configured to implement the graphics processing pipeline 1000 utilizing the hardware of the parallel processing unit 402.

Various programs may be executed within the parallel processing unit 402 in order to implement the various stages of the graphics processing pipeline 1000. For example, the device driver may launch a kernel on the parallel processing unit 402 to perform the vertex shading 1006 stage on one streaming multiprocessor 700 (or multiple streaming multiprocessor 700 modules). The device driver (or the initial kernel executed by the parallel processing unit 402) may also launch other kernels on the parallel processing unit 402 to perform other stages of the graphics processing pipeline 1000, such as the geometry shading 1010 stage and the fragment shading 1016 stage. In addition, some of the stages of the graphics processing pipeline 1000 may be implemented on fixed unit hardware such as a rasterizer or a data assembler implemented within the parallel processing unit 402. It will be appreciated that results from one kernel may be processed by one or more intervening fixed function hardware units before being processed by a subsequent kernel on a streaming multiprocessor 700.

LISTING OF DRAWING ELEMENTS 102 wireless base station
104 wireline network backbone
106 user equipment device
402 parallel processing unit
404 I/O unit
406 front-end unit
408 scheduler unit
410 work distribution unit
412 hub
414 crossbar
416 NVLink
418 interconnect
420 memory
500 general processing cluster
502 pipeline manager
504 pre-raster operations unit
506 raster engine
508 work distribution crossbar
510 memory management unit
512 data processing cluster
514 primitive engine
516 M-pipe controller
600 memory partition unit 602 raster operations unit
604 level two cache
606 memory interface
700 streaming multiprocessor
702 instruction cache
704 scheduler unit
706 register file
708 core
710 special function unit
712 load/store unit
714 interconnect network
716 shared memory/L1 cache
718 dispatch
800 processing system
802 central processing unit
804 switch
806 parallel processing module
900 exemplary processing system
902 communications bus
904 main memory
906 input devices
908 display devices
910 network interface
1000 graphics processing pipeline
1002 output data
1004 data assembly
1006 vertex shading
1008 primitive assembly
1010 geometry shading
1012 viewport SCC
1014 rasterization
1016 fragment shading
1018 raster operations
1020 input data Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S. 0 § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
   a preprocessor to transform a received wireless signal in the form of a resource grid for a plurality of user equipment devices into a matrix of symbol group features for a narrowband physical random-access channel;
   a neural network configured to transform the symbol groups from the preprocessor into predictions of active user equipment devices;
   a first twin neural network comprising:
      a first neural sub-network to transform the symbol groups from the preprocessor into time-of-arrival predictions for signals from the user equipment devices; and
      a second neural sub-network to transform the symbol groups from the preprocessor into carrier frequency offset predictions for signals from the user equipment devices.

2. The system of claim 1, wherein the preprocessor comprises logic to:
   determine averages for each symbol group in the resource grid; and
   normalize sequences of the symbol groups based on carrier frequency hopping patterns utilized by the user equipment devices.

3. The system of claim 2, the preprocessor comprising additional logic to:
   determine average received power for each of the sequences of symbol groups; and
   concatenate the average received power to the sequences of symbol groups.

4. The system of claim 1, wherein each neural sub-network comprises a pipeline of convolution layers.

5. The system of claim 4, wherein the pipeline of convolution layers is configured to determine a feature vector for each subcarrier band of the narrowband physical random-access channel and for each of the symbol groups.

6. The system of claim 4, wherein the pipeline of convolution layers includes skip connections.

7. The system of claim 4, wherein the convolution layers comprise kernels configured to operate along a frequency dimension of the symbol groups.

8. The system of claim 1, wherein the neural network, the first neural sub-network, and the second neural sub-network each comprise a multilayer perceptron.

9. The system of claim 1, wherein the second neural sub-network comprises a second twin neural network.

10. A system comprising:
    a wireless receiver to receive wireless signals; and
    a neural network configured to transform the wireless signals into (a) predictions of active user equipment devices that are transmitting carrier frequency hopping signals, (b) time-of-arrival predictions for the signals from the user equipment devices, and (c) carrier frequency offset predictions for the signals from the user equipment devices, the neural network comprising:
       a first feed-forward path to transform symbol groups derived from the wireless signals into predictions of active user equipment devices;
       a second feed-forward path to transform the symbol groups into time-of-arrival predictions for the signals from the user equipment devices; and
       a third feed-forward path to transform the symbol groups into carrier frequency offset predictions for the signals from the user equipment devices.

11. The system of claim 10, wherein the second and third feed-forward paths each comprise a pipeline of convolution layers.

12. The system of claim 11, wherein each pipeline of convolution layers is configured to determine a feature vector for each subcarrier band of a narrowband physical random-access channel and for each of the symbol groups.

13. The system of claim 10, wherein the feed-forward paths each comprise a multilayer perceptron.

14. The system of claim 10, wherein the second and third feed-forward paths comprise a twin neural network.

15. A wireless base station process comprising:
    transforming received wireless signals comprising a resource grid for a plurality of user equipment devices into a matrix of symbol group features for a narrowband physical random-access channel;
    operating a first neural network to transform the symbol group features into predictions of user equipment devices active on the base station; and
    operating a second neural network to transform the symbol group features into time-of-arrival and carrier frequency offset predictions for signals from the user equipment devices.

16. The process of claim 15, wherein operating the second neural network comprises:
    operating a first neural sub-network of a twin neural network to transform the symbol group features into the time-of-arrival predictions; and
    operating a second neural sub-network of the twin neural network to transform the symbol group features into the carrier frequency offset predictions.

17. The process of claim 15, wherein transforming the received wireless signals into the matrix of symbol group features for the narrowband physical random-access channel comprises:
    determining averages for each symbol group in a resource grid for the user equipment devices; and
    normalizing sequences of the symbol groups based on carrier frequency hopping patterns utilized by the user equipment devices.

18. The process of claim 17, wherein transforming the received wireless signals into the matrix of symbol group features for the narrowband physical random-access channel further comprises:

determining average received power for each of the sequences of symbol groups; and concatenating the average received power to the sequences of symbol groups.

19. The process of claim 15, wherein operating the second neural network to transform the symbol group features into time-of-arrival and carrier frequency offset predictions for signals from the user equipment devices comprises operating a plurality of independent pipelines of convolution layers to determine feature vectors for each subcarrier band of the narrowband physical random-access channel and for each of the symbol groups.

20. The process of claim 19, wherein the pipelines of convolution layers include skip connections and kernels configured to operate along a frequency dimension of the symbol groups.

* * * * *